(12) United States Patent
Yawn et al.

(10) Patent No.: US 11,790,159 B2
(45) Date of Patent: Oct. 17, 2023

(54) ACTIVELY ADAPTED KNOWLEDGE BASE, CONTENT CALIBRATION, AND CONTENT RECOGNITION

(71) Applicant: KIM TECHNOLOGIES LIMITED, Wirral (GB)

(72) Inventors: Richard Allen Yawn, Hillsborough,, NJ (US); Swapnil Mahendrakumar Parmar, Parsippany,, NJ (US)

(73) Assignee: KIM TECHNOLOGIES LIMITED, Wirral (GB)

( * ) Notice: Subject to any disclaimer, the term of this patent is extended or adjusted under 35 U.S.C. 154(b) by 6 days.

(21) Appl. No.: 17/648,631

(22) Filed: Jan. 21, 2022

(65) Prior Publication Data
US 2022/0215160 A1 Jul. 7, 2022

Related U.S. Application Data

(63) Continuation of application No. 16/907,646, filed on Jun. 22, 2020, now Pat. No. 11,256,861, which is a (Continued)

(51) Int. Cl.
*G06F 40/226* (2020.01)
*G06F 40/174* (2020.01)
(Continued)

(52) U.S. Cl.
CPC .......... *G06F 40/174* (2020.01); *G06F 16/313* (2019.01); *G06F 40/117* (2020.01);
(Continued)

(58) Field of Classification Search
CPC .... G06F 40/174; G06F 40/117; G06F 40/186; G06F 40/216; G06F 40/226; G06F 16/313; G06F 40/10; G06F 40/20
See application file for complete search history.

(56) References Cited

U.S. PATENT DOCUMENTS 6,330,717 B1 12/2001 Raverdy et al.
6,535,883 B1 3/2003 Lee
(Continued)

FOREIGN PATENT DOCUMENTS

EP 2782023 9/2014

OTHER PUBLICATIONS

U.S. Appl. No. 16/907,646, US 2020-0364398 A1, Jun. 22, 202, Patented.
(Continued)

*Primary Examiner* — Sanchita Roy
(74) *Attorney, Agent, or Firm* — DLA PIPER LLP US

(57) ABSTRACT

Systems for automatic document generation automatic content recognition may comprise a storage medium and a processor coupled to the storage medium. The processor may generate and/or process a document template and receive client data. In some embodiments, the processor may automatically determine whether the client data is compliant with at least one content control standard based on a comparison between the client data and at least one text variant and, if so, may automatically generate a processed document using the client data and the document template. In some embodiments, the processor may establish at least one normative form for the document template, automatically compare the client data with the normative form content, automatically recognize that the client data corresponds to the document template based on the comparing, and automatically generate a processed document using the client data and the document template.

16 Claims, 20 Drawing Sheets

Related U.S. Application Data continuation of application No. 15/707,535, filed on Sep. 18, 2017, now Pat. No. 10,733,366.

(60) Provisional application No. 62/396,552, filed on Sep. 19, 2016, provisional application No. 62/396,550, filed on Sep. 19, 2016.

(51) Int. Cl.
    *G06F 16/31*     (2019.01)
    *G06F 40/117*     (2020.01)
    *G06F 40/186*     (2020.01)
    *G06F 40/216*     (2020.01)

(52) U.S. Cl.
    CPC .......... *G06F 40/186* (2020.01); *G06F 40/216* (2020.01); *G06F 40/226* (2020.01)

(56) References Cited

U.S. PATENT DOCUMENTS

| | | |
|---|---|---|
| 7,010,746 B2 | 3/2006 | Purvis |
| 7,171,617 B2 | 1/2007 | Harrington et al. |
| 7,225,401 B2 | 5/2007 | Purvis |
| 7,451,140 B2 | 11/2008 | Purvis et al. |
| 7,774,791 B1 | 8/2010 | Appelbaum et al. |
| 7,844,897 B1 | 11/2010 | Cooley et al. |
| 7,882,131 B2 | 2/2011 | Kim |
| 7,970,862 B2 | 6/2011 | Connor et al. |
| 7,992,127 B2 | 8/2011 | Loupia et al. |
| 8,032,644 B2 | 10/2011 | Larvet |
| 8,046,441 B2 | 10/2011 | Banerji et al. |
| 8,086,951 B2 | 12/2011 | Kopp et al. |
| 8,200,714 B2 | 6/2012 | Schwartz |
| 8,230,353 B2 | 7/2012 | Cruz et al. |
| 8,370,903 B2 | 2/2013 | Teramoto et al. |
| 8,539,061 B2 | 9/2013 | Shi |
| 8,549,162 B2 | 10/2013 | Matsushima |
| 8,572,157 B2 | 10/2013 | Bouw et al. |
| 8,572,494 B2 | 10/2013 | Kuehner et al. |
| 8,627,345 B2 | 1/2014 | Malik et al. |
| 8,687,219 B2 | 4/2014 | Sato |
| 8,711,396 B2 | 4/2014 | Tian |
| 8,711,410 B2 | 4/2014 | Homma |
| 9,152,619 B2 | 10/2015 | Meschkat |
| 9,558,164 B1 | 1/2017 | Sevrinsky et al. |
| 2002/0107881 A1 | 8/2002 | Patel |
| 2004/0181527 A1 | 9/2004 | Burdick |
| 2004/0255245 A1 | 12/2004 | Yamada et al. |
| 2004/0268306 A1 | 12/2004 | Cheng et al. |
| 2005/0022115 A1 | 1/2005 | Baumgartner |
| 2006/0155725 A1 | 7/2006 | Foster et al. |
| 2007/0112810 A1 | 5/2007 | Jonsson |
| 2008/0141117 A1 | 6/2008 | King et al. |
| 2008/0168345 A1 | 7/2008 | Becker |
| 2009/0254806 A1 | 10/2009 | Bitonti |
| 2010/0094913 A1 | 4/2010 | Connor |
| 2014/0324416 A1 | 10/2014 | Lapshin |
| 2014/0351686 A1 | 11/2014 | Yawn |

OTHER PUBLICATIONS

U.S. Appl. No. 15/707,535, US 2018-0081867 A1, Sep. 18, 2017, Patented.

Aven, "Enriching Word Documents with <w:customXml>," 2008, available at: https://developer.marklogic.com/blog/smallchanges/2008-01-08.

International Search Report issued in PCT/US2017/052044 dated Jan. 17, 2018.

Written Opinion issued in PCT/US2017/052044 dated Jan. 17, 2018.

Search Report EP Application No. 17851713.2 dated Apr. 20, 2017.

European Office Action in Application No. 17851713.2 dated May 7, 2020.

European Office Action in Application No. 17 851 713.2-1231, dated Oct. 21, 2021.

600

Knowledge Base Glossary

| Account |
|---|
| Manage description, weighting and language wording options for this Account's content controls. Set the weighting for the control and weighting for each wording within the content control |

Culture

[All ▼]  ☐ Language Neutral

Ranking & Activation

☑ Allow template override  ☑ Activate Validation   Green [80.00] Amber [65.00] Red [0.00] ☑

[Update template(s)]

| Content Control | Description | Weighting | Editable | Scope | Save | Delete | Risk Exclusion | ID |
|---|---|---|---|---|---|---|---|---|
|  |  | 0.00 | ☐ | Field ▼ | ☑ | X | ☑ | 20 |
| AcceptanceCriteria |  | 15.00 | ☑ | Field ▼ | ☑ | X | ☑ | 18 |
| Agency |  | 35.00 | ☑ | Field ▼ | ☑ | X | ☑ | 11 |
| AmendmentandVariation | Amendment and Variation Clauses | 10.00 | ☐ | Field ▼ | ☑ | X | ☑ | 10 |

1-Content Control
2-Text Variant
3-Content Control Weight

Add Language Item

| Language | Weighting | Order | Save | Delete | ID |
|---|---|---|---|---|---|
| No amendment or variation of this Agreement shall be effective unless it is in writing and signed by each Parties (or their authorized Representatives). | 100.00 | 0 | ☑ | X | 11 |
| No Party may amend this Agreement. Any such attempts must be done in a separate agreement supported by unique consideration. | 0.00 | 0 | ☑ | X | 12 |

4-Text Variant Weight

Template Playbook Content Language

Manage Templates | Edit Template | Playbook | Formatted Ref. No. | Attachment Rules | Form Wizard Manage description, weighting and language wording options for this Account's content controls. Set the weighting for the control and weighting for each wording within the content control Culture
Language is set from the "Edit Template" link [All ▼] ☐ Language Neutral Ranking & Activation  ☑ Activate Validation   Green [80.00] Amber [65.00] Red [0.00] ☑

| Content Control | Description | Weighting | Editable | Scope | Save | Delete | Risk Exclusion | ID |
|---|---|---|---|---|---|---|---|---|
| AddressReceipt | | 0.00 | ☐ | Field ▼ | ☑ | X | ☑ | 493 |
| Agency | Agency Clauses | 30.00 | ☐ | Field ▼ | ☑ | X | ☑ | 619 |

Add Risk Exclusion Keyword

| Keyword | Scope | Save | Delete | ID |
|---|---|---|---|---|
| ABRC Global Excursion Inc. | Field ▼ | ☑ | X | 28 |
| MandA Omni Unlimited Corp | Field ▼ | ☑ | X | 29 |

| | | | | | | | | |
|---|---|---|---|---|---|---|---|---|
| AmendmentandVariation | Amendment and Variation Clauses | 30.00 | ☐ | Field ▼ | ☑ | X | ☑ | 620 |
| Assignment | Assignment Clauses | 45.00 | ☑ | Field ▼ | ☑ | X | ☑ | 494 |
| GoverningLaw | Governing Law Clauses | 35.00 | ☐ | Field ▼ | ☑ | X | ☑ | 495 |
| NameofRecipient | | 25.00 | ☐ | Field ▼ | ☑ | X | ☑ | 496 |

Non-Disclosure Agreement

Please complete the required information set out in each of the sections below. Select the blue button on the right hand side of the screen to continue to the next section. Fields marked with an asterisk (*) are required fields.

| Shortcut Reference | NDA Details | Submit NDA |

1 2 

Kim Technologies
Please complete all details below

Terms and Termination:* 🔍

This Agreement will commence on the Commencement Date and will remain in effect notwithstanding completion, fulfilment or early termination of the Purpose for a period of five years from the Commencement Date, save that Confidential Information about the Company's customers shall be kept confidential by the Recipient and Representatives indefinitely. Either Party may terminate this Agreement on 30 Days written notice to the other party. The obligations of this Agreement in relation to the Confidential Information will remain in force post termination.

Agreement:* 🔍

The Recipient shall not assign, subcontract, transfer or novate this Agreement or any right or obligation under this Agreement. The Disclosing Party may assign, transfer or novate this Agreement and its rights and obligations under this Agreement to any Group Company without the consent of the Recipient.

Governing Law:* 🔍

This Agreement and any dispute or claim (including non-contractual disputes or claims) arising our of or in connection with it shall be governed by and construed in accordance with the laws of United States and Parties submit to the exclusive jurisdiction of the courts of New Jersey, located within the United States.

FIG. 9

Non-Disclosure Agreement

1000

> Please complete the required information set out in each of the sections below. Select the blue button on the right hand side of the screen to continue to the next section. Fields marked with an asterisk (*) are required fields.

| Shortcut Reference | NDA Details | Submit NDA |

1 2

Kim Tec ▦ Term and Termination:*  ☒

Please c

| Language | Weightage | Select |
|---|---|---|
| This Agreement will commence on the Commencement Date and will remain in effect notwithstanding completion, fulfilment or early termination of the Purpose for a period of five years from the Commencement Date, save that Confidential Information about the Company's customers shall be kept confidential by the Recipients and Representative indefinitely. Either Party may terminate this Agreement on 30 Days written notice to the other party. The obligations of this Agreement in relation to the Confidential Information will remain in force post termination. | 100.00 | ○ |
| This Agreement will commence on the Commencement Date and will remain in effect notwithstanding completion, fulfilment or early termination of the Purpose for a period of one year from the Commencement Date, save that Confidential Information about the Company's customers shall be kept confidential by the Recipients and Representative indefinitely. Either Party may terminate this Agreement on 10 Days written notice to the other party. The obligations of this Agreement in relation to the Confidential Information will remain in force post termination. | 75.00 | ○ |

Governi

This Agreement and any dispute or claim (including non-contractual disputes or claims) arising out of or in connection with it shall be governed by and construed in accordance with the laws of United States and Parties submit to the exclusive jurisdiction of the courts of New Jersey, located within the United States.

Non-Disclosure Agreement

Please complete the required information set out in each of the sections below. Select the blue button on the right hand side of the screen to continue to the next section. Fields marked with an asterisk (*) are required fields.

| Shortcut Reference | NDA Details | Submit NDA |

Document Rating  93.42%

[Submit]

My Shortcut Reference
For Patent Pending

Attachments
0 attachments

[Preview Non-Disclosure Agreement] [Validation Document]

[Submit]

| Agency | Agency Clauses | 30.00 | ☐ | Field ▼ | ☑ | ☒ | ☑ | 619 |

| Add Text Variance | | | | | |
|---|---|---|---|---|---|
| Language | Weighting | Order | Save | Delete | ID |
| Nothing in this Agreement shall be taken to create an agency, partnership, joint venture or any other similar relationship between the Parties | 100.00 | 1 | ☑ | ☒ | 609 |

| AmendmentandVariation | Amendment and Variation Clauses | 30.00 | ☐ | Field ▼ | ☑ | ☒ | ☑ | 620 |

| Add Text Variance | | | | | |
|---|---|---|---|---|---|
| Language | Weighting | Order | Save | Delete | ID |
| No amendment or variation of this Agreement shall be effective unless it is in writing and signed by each Parties (or their authorized Representatives). | 85.00 | 0 | ☑ | ☒ | 600 |
| No party may amend of this Agreement. Any such attempts must be done in a separate agreement supported by unique consideration. With text and weighting that is different than what is at the account | 15.00 | 0 | ☑ | ☒ | 661 |

| Assignment | Assignment Clauses | 45.00 | ☑ | Field ▼ | ☑ | ☒ | ☑ | 494 |

| Add Text Variance | | | | | |
|---|---|---|---|---|---|
| Language | Weighting | Order | Save | Delete | ID |
| The Recipient shall not assign, subcontract, transfer or novate this Agreement or any right or obligation under this Agreement. The Disclosing Party may assign, | 100.00 | 1 | ☑ | ☒ | 672 |
| The Recipient is able to assign, subcontract, transfer or novate this Agreement or any right or obligation under this Agreement provided the Recipient seek permission | 75.00 | 2 | ☑ | ☒ | 673 |
| The Recipient may assign, subcontract, transfer or novate this Agreement or any right or obligation under this Agreement. The Disclosing Party may assign, | 50.00 | 3 | ☑ | ☒ | 673 |

| AuthorizedDisclosure | | 20.00 | ☐ | Field ▼ | ☑ | ☒ | ☑ | 2199 |

Content Calibration and Recognition

| Manage Templates | Edit Template | Playbook | Formatted Ref. No. | Attachment Rules | Form Wizard | Content Calibration and Recognition |

KIM_NDA.DOCX – Non-Disclosure Agreement - 51

○ andyquery.docx  X    Coverage Threshold  45 %         Update

© Kim Technologies 2012-16. Patents Pending. All Rights Reserved.
Knowledge Automation Platform.
Knowledge, Intelligence, and Meaning: supporting knowledge workers everywhere.

Content Calibration and Recognition

Manage Templates | Edit Template | Playbook | Formatted Ref. No. | Attachment Rules | Form Wizard | Content Calibration and Recognition

KIM_NDA.DOCX – Non-Disclosure Agreement - 51

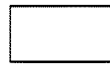 Select   Coverage Threshold  45 %   Update

File andyquery.docx matches template KIM_NDA.DOCX – Non-Disclosure Agreement – 51

Match Score: 75.1871%
Coverage: 65.1992%
KB Score: 41.15%

Highlighted Source Document

© Kim Technologies 2012-16. Patents Pending. All Rights Reserved.
Knowledge Automation Platform.
Knowledge, Intelligence, and Meaning: supporting knowledge workers everywhere.

FIG. 17

ACTIVELY ADAPTED KNOWLEDGE BASE, CONTENT CALIBRATION, AND CONTENT RECOGNITION

CROSS-REFERENCE TO RELATED APPLICATION

This application is a continuation of U.S. patent application Ser. No. 16/907,646, filed Jun. 22, 2020, which is a continuation of U.S. patent application Ser. No. 15/707,535 (now U.S. Pat. No. 10,733,366), filed Sep. 18, 2017, which are based upon and claim the benefit of priority from U.S. Provisional Patent Application No. 62/396,550, entitled "ACTIVELY ADAPTED KNOWLEDGE BASE WITH A PREDICTIVE RATING," filed Sep. 19, 2016 and U.S. Provisional Patent Application No. 62/396,552, entitled "CONTENT CALIBRATION AND RECOGNITION," filed Sep. 19, 2016, the entirety of each of which is incorporated by reference herein.

BRIEF DESCRIPTIONS OF THE DRAWINGS

FIGS. 6 and 7 are example user interface screenshots according to an embodiment of the invention.

FIGS. 9 and 10 are example user interface screenshots according to an embodiment of the invention.

FIG. 12 is an example user interface screenshots according to an embodiment of the invention.

FIGS. 15-17 are example user interface screenshots according to an embodiment of the invention.

DETAILED DESCRIPTION OF SEVERAL EMBODIMENTS

Figure 1:
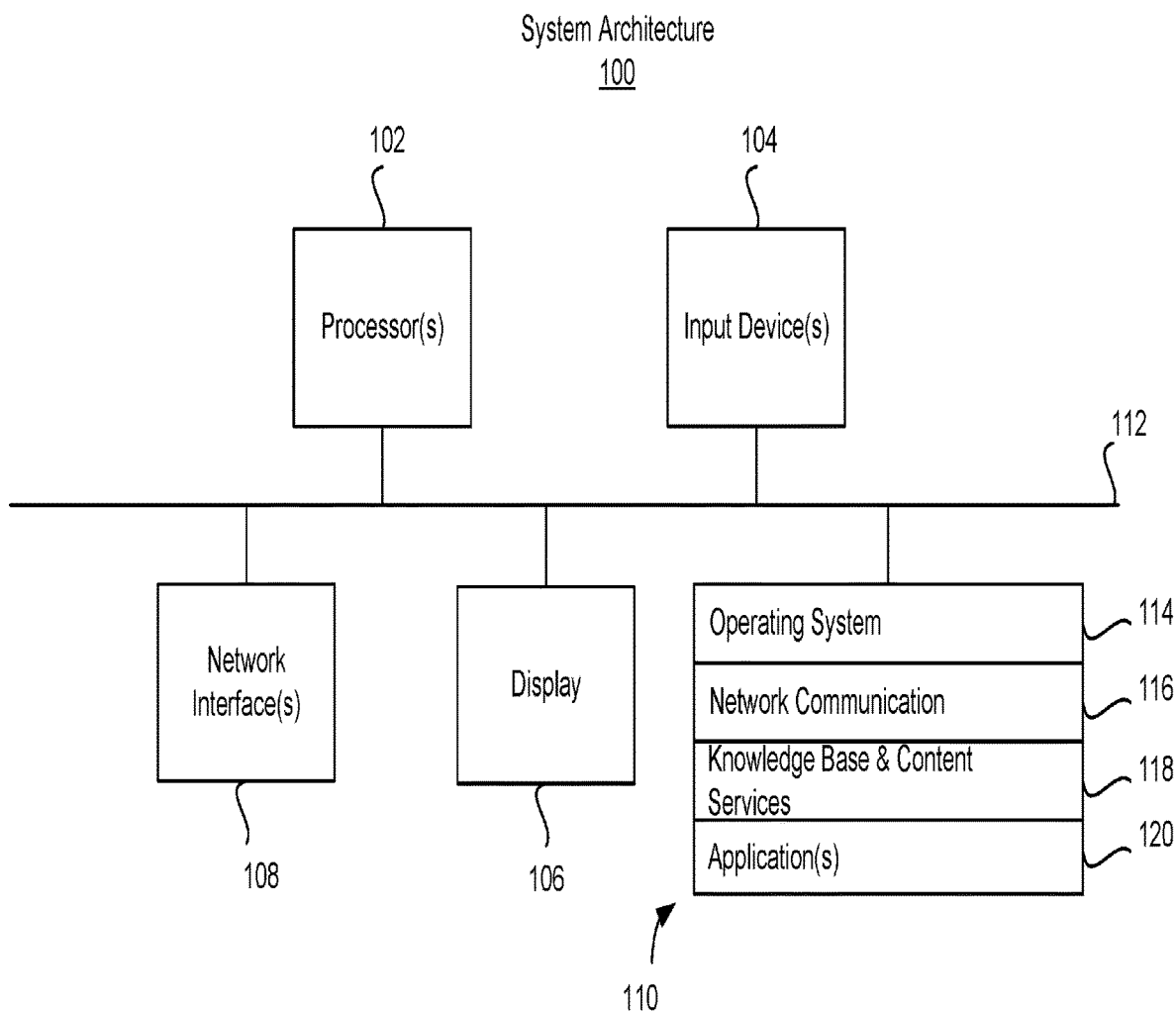
FIG. 1 is a block diagram of an example system architecture according to an embodiment of the invention.

Automatic profiling, evaluation, and deterministic outcome of large and complex volumes of content may be used by many businesses to operate within tolerant and profitable operational efficiencies when identifying how the contents impact business operations. In some cases, the content may not represent how the knowledge contained within should conform when compared to an organization's normative forms. In some cases, content may have conflicting terms when comparing like content across normative forms. In some cases, normative forms may be flexible in that different forms may allow specified information to be placed within specified regions differently and/or may require compliance language effective by or on a specific date and time for specific content types. In some cases, normative forms and/or existing content may change, so existing content may require adjustment and may be evaluated once again to a template's normative form.

Accordingly, systems and methods described herein may create and maintain active normative forms. Systems and methods described herein may evaluate any new content being introduced into an organization by automatically comparing against templates' normative forms as represented in an active knowledge base. The knowledge base, when updated, may evaluate existing content for any changes that may be impacted by what was once acceptable no longer being acceptable. Systems and methods described herein may provide automatic profiling, evaluation and deterministic outcome of content streams, for example including evaluating the collective embodiment of one content stream, with some phrases within the content being more restrictive to an organization's business then other phrases, in order to rate the evaluated content and compare the evaluated content against all other documents' content. This automation may enable several functions. For example, one function may limit the intake of non-conforming content into an organization, and another function may evaluate existing content for conflicts as an organization changes how they do business as prescribed in the active knowledge base.

The automatic profiling and evaluation of large and complex volumes of content may be used to provide automatic content calibration and recognition. For example, systems and methods described herein may provide a utility where knowledge workers define templates with content controls that identify textual variance from an organization's normative forms. Content controls may be specified from normative form templates. Ratio, frequency, and/or density formulas may be utilized to recognize source content streams based on the content controls. Reference documents may be calibrated through testing of contiguous frequency, density, and/or content control ratios to form templates. When a new electronic document is received, its content may be evaluated amongst all templates for automatic recognition. Upon match, the electronic document may be assigned to the matching template ID. If a match is not found, the electronic document may be submitted to an area for manual evaluation. The recognition process may provide a mechanism that stores electronic documents in a single location, identifies the electronic documents correctly, and identifies matching templates for correct evaluation.

Example System Architecture

As described in detail herein, the systems creating and maintaining the adapted knowledge base and performing automatic content calibration and recognition may comprise one or more computers. For example, reference is made herein to one or more servers and/or components thereof that perform processing related to automatic profiling, evaluation, and deterministic outcome of large and complex volumes of content. FIG. 1 is a block diagram of an example architecture for a system 100 that may implement the features and processes described herein.

The system 100 may be implemented on any electronic device that runs software applications derived from compiled instructions, including without limitation personal computers, servers, smart phones, media players, electronic tablets, game consoles, email devices, etc. In some implementations, the system 100 may include one or more processors 102, one or more input devices 104, one or more display devices 106, one or more network interfaces 108, and one or more computer-readable mediums 110. Each of these components may be coupled by bus 112.

Display device 106 may be any known display technology, including but not limited to display devices using Liquid Crystal Display (LCD) or Light Emitting Diode (LED) technology. Processor(s) 102 may use any known processor technology, including but not limited to graphics processors and multi-core processors. Input device 104 may be any known input device technology, including but not limited to a keyboard (including a virtual keyboard), mouse, track ball, and touch-sensitive pad or display. Bus 112 may be any known internal or external bus technology, including but not limited to ISA, EISA, PCI, PCI Express, NuBus, USB, Serial ATA or FireWire. Computer-readable medium 110 may be any medium that participates in providing instructions to processor(s) 102 for execution, including without limitation, non-volatile storage media (e.g., optical disks, magnetic disks, flash drives, etc.), or volatile media (e.g., SDRAM, ROM, etc.).

Computer-readable medium 110 may include various instructions 114 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 104; sending output to display device 106; keeping track of files and directories on computer-readable medium 110; controlling peripheral devices (e.g., disk drives, printers, etc.) which can be controlled directly or through an I/O controller; and managing traffic on bus 112. Network communications instructions 116 may establish and maintain network connections (e.g., software for implementing communication protocols, such as TCP/IP, HTTP, Ethernet, etc.).

Knowledge base and content service instructions 118 can include instructions that provide the actively adapted knowledge base and/or content calibration and recognition described herein. Application(s) 120 may be an application that uses or implements the processes described herein and/or other processes. The processes may also be implemented in operating system 114.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Definitions

Figure 3A:
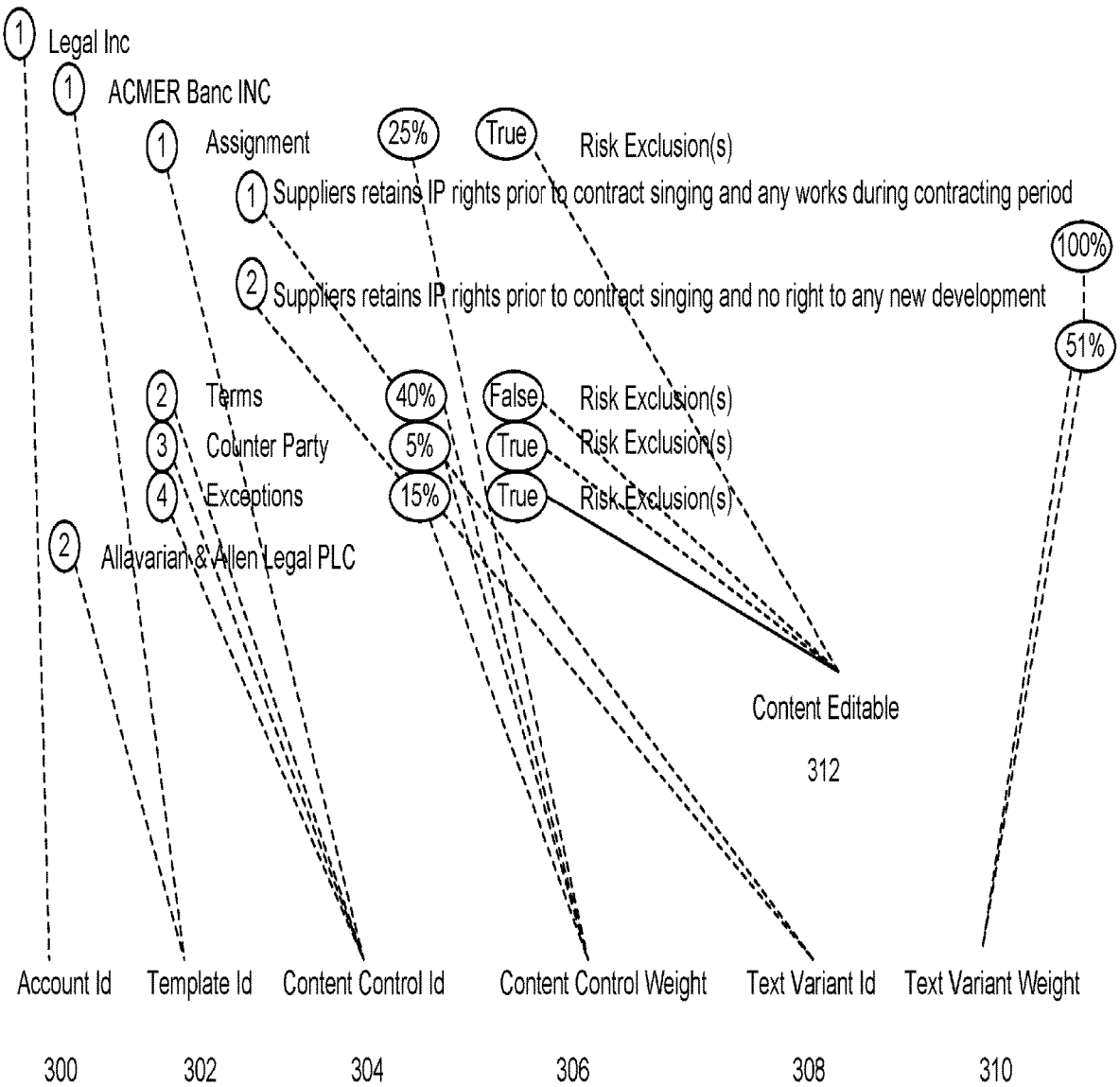
FIGS. 3A and 3B are graphical representations of definition terms according to an embodiment of the invention.
Figure 3B:
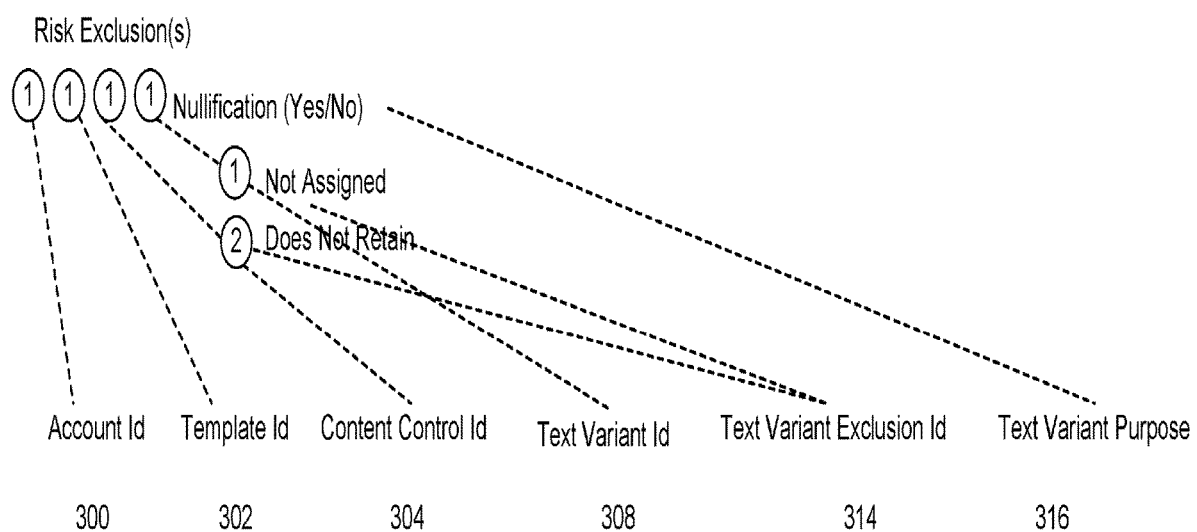

The following terms may be useful for understanding the systems and methods providing an actively adapted knowledge base, content calibration, and content recognition as described herein. FIGS. 3A and 3B are graphical representations of definition terms illustrating their relationships to one another.

Knowledge Base—The underlying set of facts, assumptions, and rules that a computer has available to solve a problem.

Knowledge Worker—A worker whose main capital is knowledge.

End User—A person ultimately uses or is intended to ultimately use a product.

Account ID—Classification that identifies a collection of templates (see Account ID 300 in FIGS. 3A-3B).

Template ID—Classification that identifies a collection of content controls (see Template ID 302 in FIGS. 3A-3B).

Content Control ID—Classification that identifies a collection of text variations. The content control may optionally be assigned a numeric weighting that is the proportional significance of the content control with respect to a template amongst the population of content controls in that template (see Content Control ID 304 in FIGS. 3A-3B).

Text Variant ID—Classification that identifies a specific text phrase. The text variant may optionally be assigned a numeric weighting that is the proportional significance of the text variant with respect to that content control's numeric weighting (see Text Variant ID 308 in FIGS. 3A-3B).

Text Variant Exclusion ID—Classification that identifies a text phrase utilized for exclusions (see Text Variant Exclusion ID 314 in FIG. 3B).

Text Variant Exclusion Purpose—The text variant exclusion purpose is, by default, the special index as related proportionally to the source sentence. When nullification is set, the entire content stream is void; otherwise only the content control is void, and that content control's weight goes to zero (see Text Variant Exclusion Purpose 316 in FIG. 3B).

Content Stream—A content-stream is a binary stream. Its maximum length is repository-specific. Each content-stream has a MIME Media Type, as defined by RFC2045 and RFC2046. A content-stream's attributes are represented as properties of the content-stream's containing document object. There is no MIME-type-specific attribute or name directly associated with the content-stream outside of the document object.

Content Control—Literal bound area within a content stream that is a clause or data point.

Content Editable—Identifies whether the text variant only allows prescribed language for free type (see Content Editable 312 in FIG. 3A).

Template—Knowledge content stream.

Template Ranged Weightings—Each template contains bound ranges that identify how a source content stream evaluates against the knowledge base content controls' weighted accumulation. For example, the boundaries may be red, amber, and green. In this example, weighted content control accumulations greater than or equal to the green value automatically pass, weighted content control greater than or equal to the amber value and less than the green value require manual evaluation, and weighted content control below the amber value automatically fail.

Content Control Weighting—The weighting of the content control when applied to the template amongst the population of the template's other content controls (see Content Control Weight 306 in FIG. 3A).

Text Variant Weighting—The weighting of the text variant as a ratio of the content control (see Text Variant Weight 310 in FIG. 3A).

Normative Form—Template content stream and content control collection of text variants that optionally specify clause language.

Playbook—A collection of template normative forms.

Sequences—Identification of content sequence paths can be in two forms; the first is the sequencing from the knowledge base, and the second is the sequencing from the source content stream.

Knowledge Base Sequences—Texts variant with weighting.

Source Content Stream Sequences—The content stream.

Sequence Path—A numerical path to the identified source of reference that can be determined by utilizing the following description of graphical terms to determine sequence paths, for example:

a. In FIG. 3A, the sequence path may be formed as a path comprising account ID 300, template ID 302, content editable 312, content control ID 304, content control weight 306, text variant ID 308, and text variant weight 310. Thus, 1,1,1,1,25,1,100 identifies "Supplier retains IP rights prior to contract signing and any works during contracting period"

b. In FIG. 3B, the sequence path may be formed as a path comprising account ID 300, template ID 302, content control ID 304, text variant ID 308, text variant exclusion ID 314, and text variant purpose 316. Thus, 1,1,1,1,1,0 identifies "Not Assigned"

Dice Coefficient—String comparison of spatial overlay index.

Clause—A sub content stream entity within a content stream that is a specific identification such as termination, governance, specification, or other sub content stream entity.

Data Point—Atomic content entity within a content stream that is an element such as termination date, contract start date, customer name, defendant name, or other atomic content entity.

Phrase Construction—A process involving selecting account, template, and content control and entering a clause that results in text variant ID.

Prescriptive Scoring—A scoring process that may proceed as follows. For the content control, select the account, template, and content control and then enter a decimal number for the weighting. For the text variant, select the account, template, content control, and text variant and then enter a decimal number for the weighting.

Document Generation—A process involving selecting template and free type clauses and data points or retrieve clauses from the knowledge base which then results in a normative form document being generated. For example, document generation from the knowledge base may be performed by linking a web form or web service (through which a user may interact) content control name to a knowledge base content control name by template.

Phrase Selection—Upon selecting a template, a list of phrases is presented from which the desired clause is selected. Phrase selection may allow selection by listing content control's text variants from knowledge base.

Exclusion—A process involving selecting account, template, content control, and risk exclusions and entering undesirable phrases. Exclusions may be text phrases that, when evaluated against a content stream's content control, may either nullify the entire content stream or content control within the content stream by setting result to 0.

Coefficient Evaluation—A comparison of text variants' special index against a source content stream. Coefficient evaluation may occur during text variant match and text variant exclusion. Coefficient evaluation may involve extracting each of the content streams' content controls and retrieving each content control's text variants and exclusions from knowledge base by name and ID. Highest spatial index coefficient may be determined from content control text amongst text variants and any spatial index coefficient above 0 when exclusion is compared against content control text.

Predictive Rating—The accumulation of content control and text variant weightings calculated during source content stream evaluation. For example, predictive rating may be performed by accumulating the sum of all content controls' weightings times the text variants' weightings rebalanced to 100%.

Feedback Loop—Control the behavior of a system by comparing its output to a desired value and applying the difference as an error signal to dynamically change the output so it is closer to the desired output.

Content Recognition—A process whereby normative form template content control text variants utilize spatial index and frequency tampering for proper identification of source content streams.

Content Calibration—A knowledge worker process whereby normative form template content control text variants are added or changed to evaluate ratio, frequency, and/or density of reference source document streams.

Point of Interest—A focus point in a content stream. For example, this could be a labeled area of a content stream such as indemnity, jurisdiction, terms, or other labeling; and/or a continuous steam of information that is not labeled. Either case may spatially represent a concept that is a content control's name.

Unit of Concentration—An embodiment of text that relates to point of interest that is the name of a content control.

Text Phrase—A sentence, a series of sentences, and/or a series of comma separated, colon separated, semi-colon separated, parenthesis, and/or line break separated statements that may be selected as a unit of concentration.

Related Frequency—A measure of the number of times that an event occurs.

Contiguous Frequency—A distance between two or more frequencies ordered by sequential identifier.

Cumulative Relative Frequency—A statistical calculation figured by adding together previously tabulated relative frequencies that makes a running total along a frequency table.

Combined Relative Related Frequency—Similar related frequencies within a content stream that are separated by non-contiguous source content sequence with a spatial index greater than or equal to some percentage (e.g., 65%).

Knowledge Content Sequences—Individual sentence tokenization of knowledge base content control text variants with each sentence having its own unique and sequential identifier and collectively representing a set of related information that may optionally contain a weighting.

Source Content Sequence—A tokenization of the entire source content stream by sentence, comma, and/or semicolon whereby each token is represented by sequential numeric identifier.

Coverage threshold—A minimum coverage area of source document/content for which a recognized normative form should cover to be in compliance.

Nominal Threshold—Minimum string distance between source content sequence and knowledge content sequence to recognize a valid match between the two (e.g., 65.0).

Nominal Normative Form—Minimum threshold to determine valid match (e.g., 2.5).

Actively Adapted Knowledge Base

The actively adapted knowledge base may provide on demand prescriptive composition of content controls for content evaluated by the system. Each content control may include a rating and one or more phrase selection variants. Each phrase selection variant may define a weighting indicating how that phrase weights against the content control. Each content control may contain exclusion phrases. Each content control may contain an editable flag that may specify whether free text entry is enabled. Each content control may define how that control weights against a predictive rating that is the collective score of all content controls. The predictive ratings may be compared against variable threshold ranges that identify automatic acceptance, human evaluation, or automatic failure.

The content controls and predictive rating may utilize a template. Templates may be associated with one or more accounts. Each template may contain variable content control subsets. Each template may be identified by unique number. Each template may retrieve content controls, scores, exclusions, and/or editable properties from an account for each named field that is matched in the template when that template is uploaded to the knowledge base and stored independently for that template in the knowledge base. A template may utilize the account's collective scoring or may override that template's scoring. Each content control language variant within the template may remain without change, be changed, be removed, or have additional language variants added to that content control, with properties for each variant capable of being overridden. The content controls' variants within each template, when changed for a specific template, may mark the property identifying that content control as being overridden. When a content control variant has not been overridden, all content controls within all templates within an account may be updated from that account. The prescriptive representation of the templates may be used to calculate score and predict automatic acceptance, human evaluation, or failure of any content.

For example, content may be submitted and/or stored as described in U.S. Patent Publication No. 2014/0351686, entitled "Expert System for Automation, Data Collection, Validation, and Managed Storage Without Programming and Without Deployment," the entirety of which is incorporated by reference herein. In U.S. Patent Publication No. 2014/0351686, a computer system may receive a document template that has been annotated with a markup language to contain one or more data tagging elements. The system may process the document template to automatically generate a unique identifier for the document template and automatically generate a unique identifier for each data tagging element contained in the document template. The system may automatically map each data tagging element onto a base structure within the template processing engine, wherein the data tagging elements and mappings collectively define a scheme for the document template. The system may save the document template with mappings to the base structure to the storage. The system may also receive client data, automatically validate the client data using the unique identifiers to determine that the client data corresponds to the document template, and automatically generate a processed document using the client data and the document template.

Scoring and prediction may occur in real-time as content is received and extracted from that content's submission by first identifying the source of the content by template ID and retrieving the associated template ID with content controls from the knowledge base. Each content control's field name from the submitted content may be matched against each content control field name from the knowledge base template associated to that template. A phrase may be extracted from the matched content control's field and evaluated against each phrase from the content control field retrieved from the knowledge base. If an exact match is found, then the score from the variant may be proportionally calculated against that weighting for that content control's score. If there is not an exact match, then the same phrase may be evaluated against each language variant to determine relative distance (e.g., using dice coefficient). The match with the highest score by variant may apply the coefficient's score against the content control's variant weighting as an average and may be proportionally distributed amongst that content control's weighting. The content control matching process may repeat until all content controls have been extracted from the submitted content. Upon match completion, the content control's matching scores may be accumulated and compared against the knowledge base template's automatic pass, human evaluation, and automatic failure scoring ranges to provide the predictive outcome of the evaluation.

Figure 2:
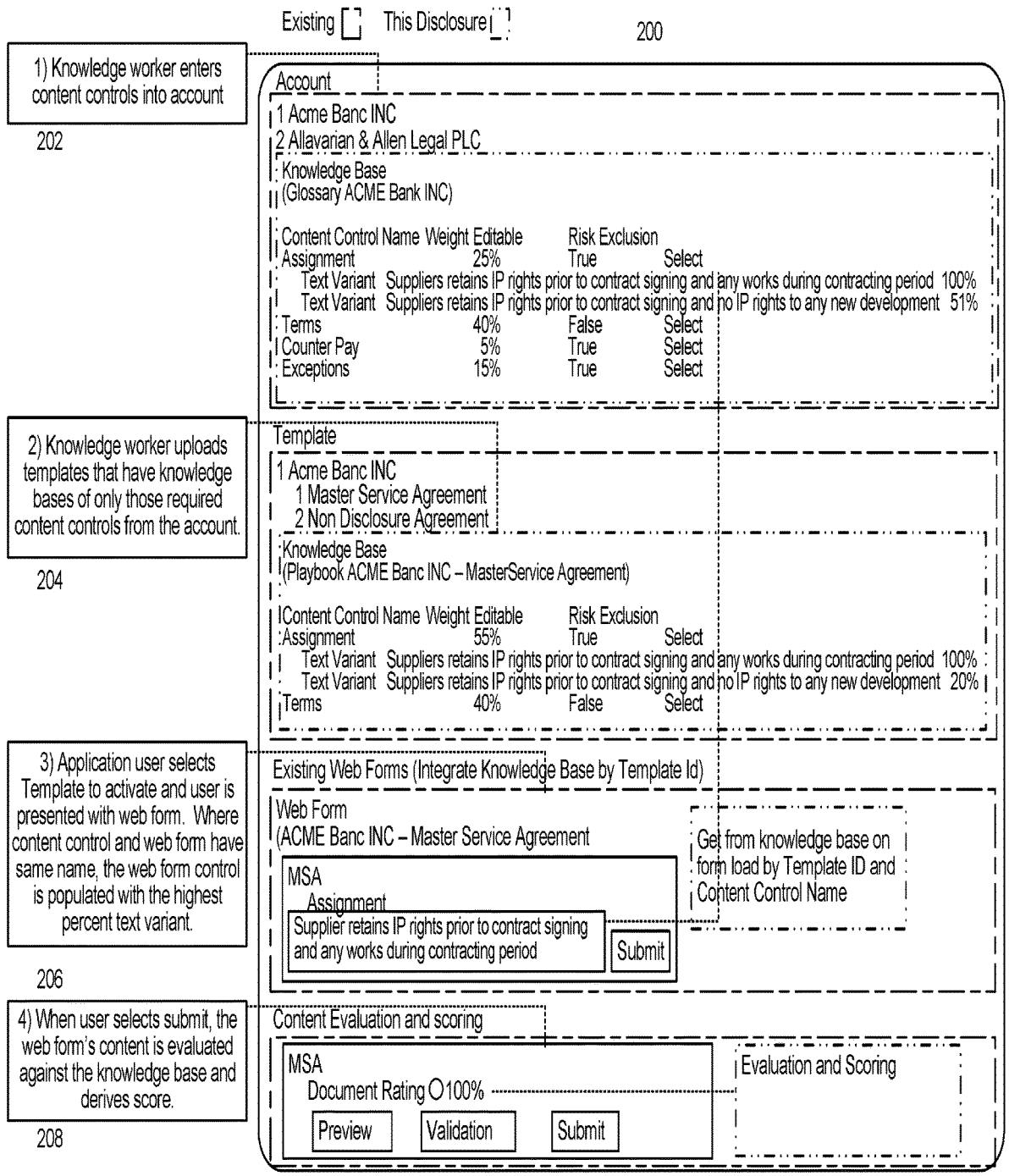
FIG. 2 is a content evaluation and scoring process according to an embodiment of the invention.

FIG. 2 is a content evaluation and scoring process 200 according to an embodiment of the invention. Process 200 is an overview of content evaluation and scoring, and specific aspects thereof are expanded upon in this section. Process 200 is presented from the perspective of a knowledge worker entering a template that has been created according to the teachings of U.S. Patent Publication No. 2014/0351686 and/or an end user evaluating the template.

In 202, the knowledge worker may enter content controls into the account with which the template is associated. In 204, the knowledge worker may upload the template and/or additional templates having knowledge bases overlapping with the content controls entered in 202.

In 206, the end user may select the uploaded template and may be presented with a form. The end user may fill in the form. In 208, the end user may submit the selected template and form for evaluation, and system 100 may evaluate the form's content against the knowledge base of the template and generate a score for the form's content. The score may provide an indication of similarity and/or compliance between the form's content and the template's content controls. These processes are described in greater detail below.

As described in U.S. Patent Publication No. 2014/0351686, a computer (e.g., system 100) may establish a database template of identified content controls for each template (e.g., DocX template) that is used as a foundation for web forms, web services, document generation configurations, or other type of template in support of business solutions.

The following processes may extend the capability of system 100 with knowledge base enhancements that may provide real time interaction with knowledge content streams being evaluated against source content streams submitted as described in U.S. Patent Publication No. 2014/0351686. The following processes may further extend the capability of system 100 by providing a mechanism whereby system 100 may generate documents from knowledge content streams. The capabilities of evaluating source content streams and generating documents from knowledge content streams may both result in predictive rating.

Figure 4:
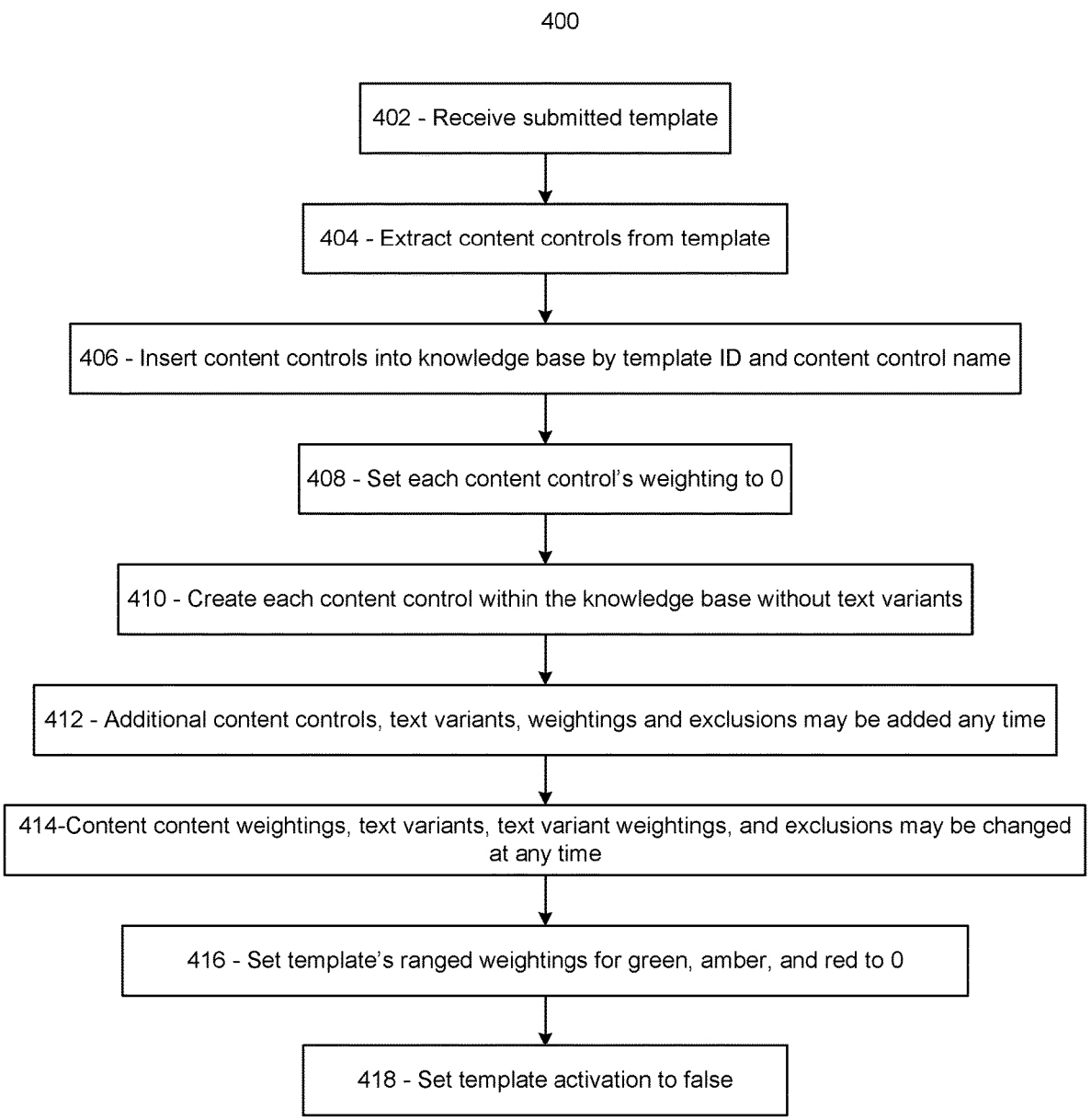
FIG. 4 is a knowledge base generation process according to an embodiment of the invention.

FIG. 4 is a knowledge base generation process 400 according to an embodiment of the invention. System 100 may perform process 400 to prepare a template for further processing as described below.

In 402, system 100 may receive a submitted template. For example, U.S. Patent Publication No. 2014/0351686 describes how a template may be submitted. In 404, system 100 may extract content controls from the submitted template (e.g., based on elements identifying clauses or data points as tagged as described in U.S. Patent Publication No. 2014/0351686).

In 406, system 100 may insert the extracted content controls into a knowledge base (e.g., within system 100 memory or storage) and identified therein by template ID and/or content control name. In 408, system 100 may set each content control in the knowledge base to 0. In 410, system 100 may store and/or reset each content control to have no text variants.

In 410, system 100 may add additional content controls, text variants, weightings, and/or exclusions not extracted from the submitted template. For example, the additional elements may be added by a knowledge worker through a user interface provided by system 100. Note that while step 410 is illustrated in sequence in FIG. 4, these additional elements may be added to the knowledge base at any time.

In 412, system 100 may change content control weightings, text variants, text variant weightings, and/or exclusions. For example, the changes may be specified by a knowledge worker through a user interface provided by system 100. Note that while step 412 is illustrated in sequence in FIG. 4, these changes may be made to the knowledge base at any time.

In 416, system 100 may set the template's ranged weightings to 0. In 418, system 100 may set template activation to false. The settings entered according to process 400 may be stored in system 100 memory and/or storage, and the knowledge base may be ready for further use (e.g., according to the processes described below).

Figure 5:
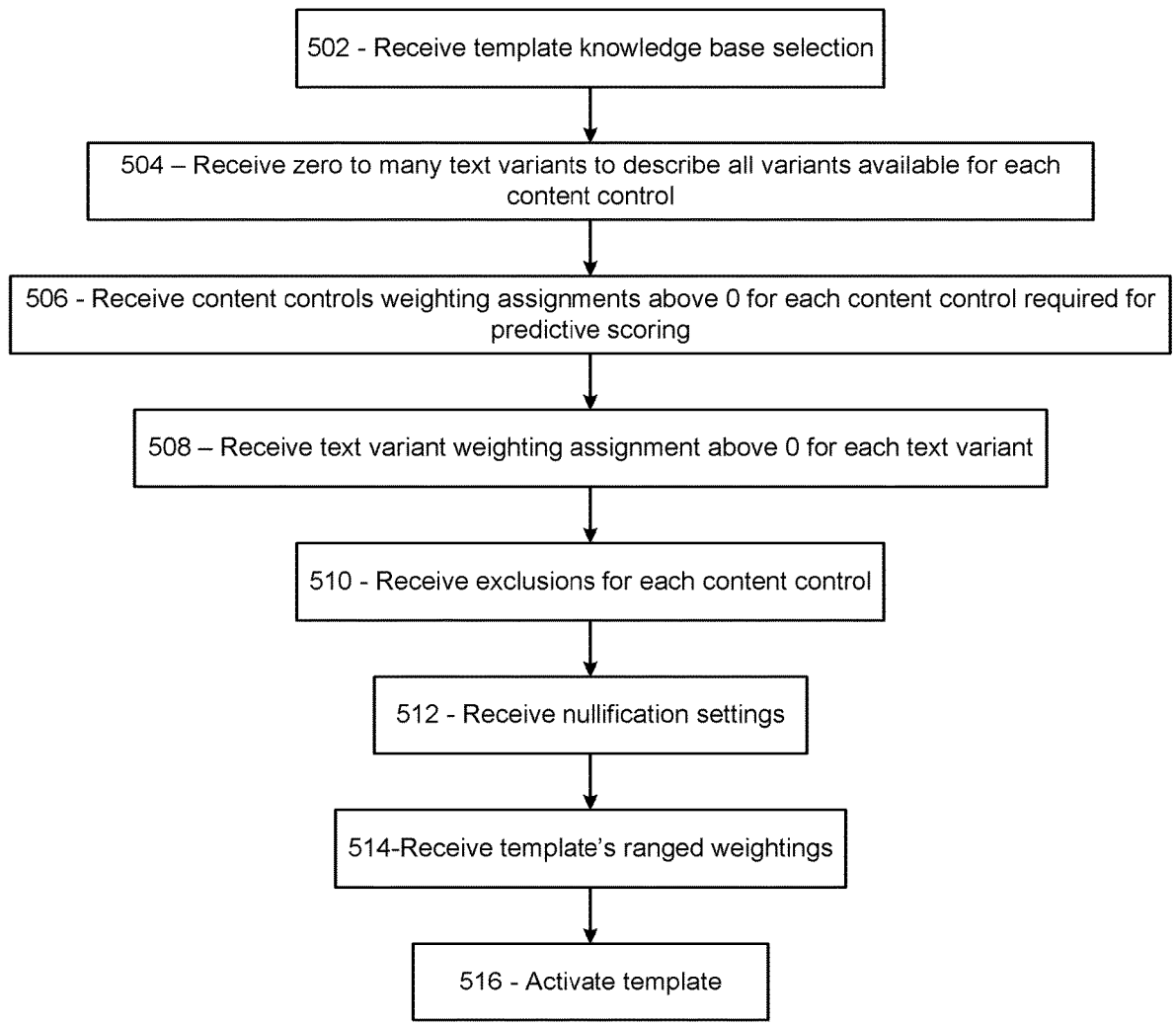
FIG. 5 is a knowledge acquisition process according to an embodiment of the invention.

FIG. 5 is a knowledge acquisition process 500 according to an embodiment of the invention. System 100 may perform process 500 to acquire data and settings for a knowledge base, for example a knowledge base prepared according to process 400 described above.

In 502, system 100 may receive a selection of a knowledge base for processing. For example, a knowledge worker may select a knowledge base to modify through a user interface provided by system 100.

In 504, system 100 may receive text variants as needed to appropriately describe variants available for each content control. In 506, system 100 may receive content control weighting assignments above 0 for each content control that will be used in predictive scoring as described below. In 508, system 100 may receive text variant weighting assignments above 0 for each received text variant. System 100 may save text variants and weighting assignments for the knowledge base in system 100 memory and/or storage. FIG. 6 shows an example interface 600 whereby the knowledge worker may enter the text variants and weighting assignments.

In 510, system 100 may receive exclusions for each content control. In 512, system 100 may receive nullification settings for each content control. For example, system 100 may set nullification to true when coefficient detection is greater than 0 and nullifies control and may not set nullification when coefficient detection is greater than 0 and nullifies content stream. System 100 may save text exclusions and nullifications for the knowledge base in system 100 memory and/or storage. FIG. 7 shows an example interface 700 whereby the knowledge worker may enter exclusion and/or nullification settings.

In 514, system 100 may receive ranged weightings for the knowledge base. For an example with green, amber, and red ranges, system 100 may receive a green lower limit and an amber lower limit. The green lower limit may establish a limit for content streams that automatically pass with scores that are greater than or equal to the green lower limit. The amber lower limit may identify the content stream as requiring human evaluation when its score is greater than or equal to the amber lower limit and less than the green lower limit. Any other score may be considered red, causing the content stream to fail. System 100 may save ranged weightings for the knowledge base in system 100 memory and/or storage.

In 516, system 100 may activate the knowledge base template when ready to use (e.g., when the aforementioned settings have been made). For example, system 100 may activate in response to a user command through a user interface.

Figure 8:
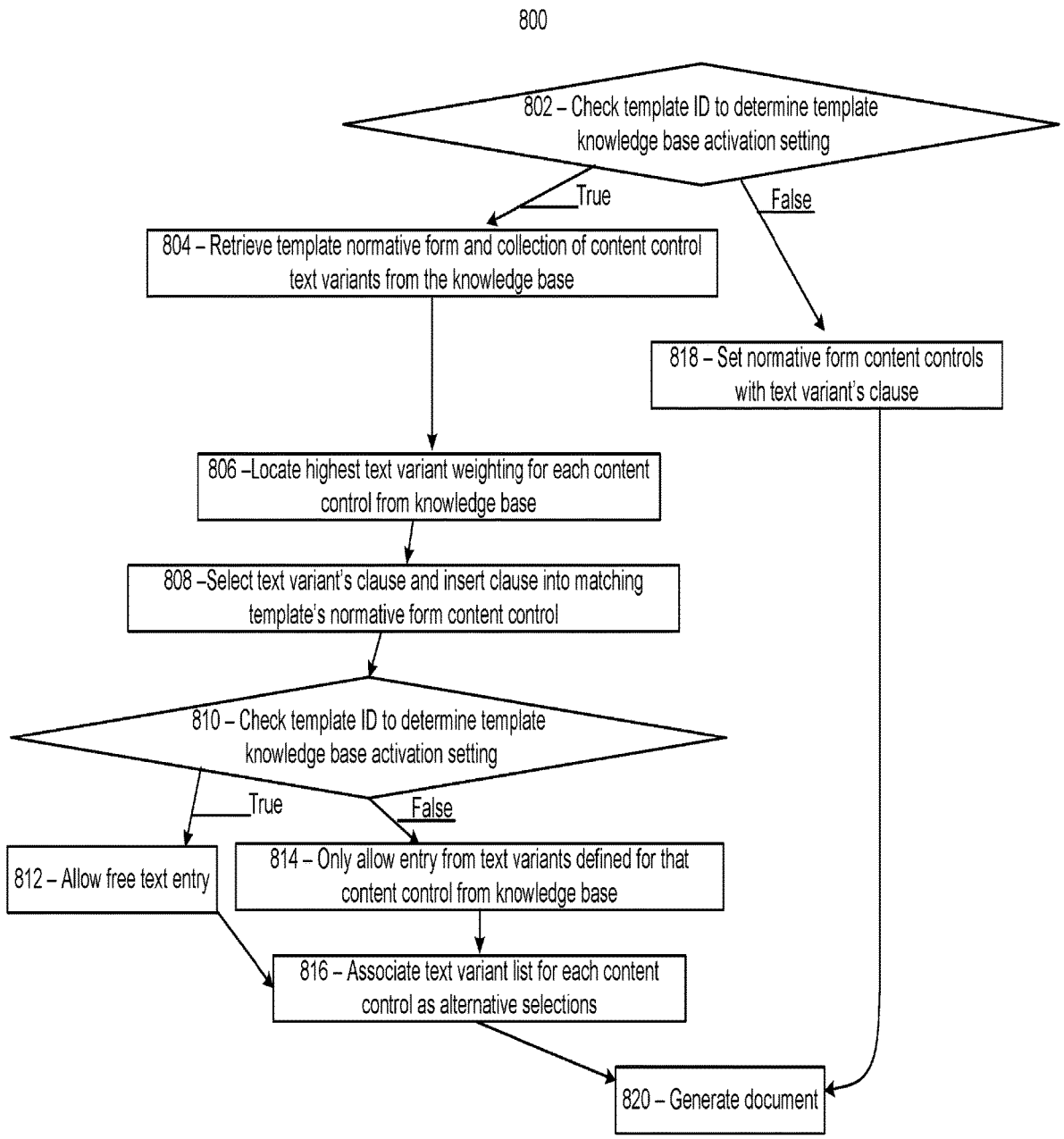
FIG. 8 is a document generation process according to an embodiment of the invention.

FIG. 8 is a document generation process 800 according to an embodiment of the invention. System 100 may perform process 800 to generate a document from a knowledge base template, for example a knowledge base template prepared according to process 500 described above. For example, a user may submit a template ID into a user interface of system 100 to initiate process 800.

In 802, system 100 may check the template ID to determine a template knowledge base activation setting. If the setting indicates the template knowledge base is active, in 804, system 100 may retrieve the template normative form and collection of content control text variants from the knowledge base. If the setting indicates the template knowledge base is not active, in 818, system 100 may set the normative form content controls for the template with default clauses for each text variant and go to step 820 described below.

In 806, system 100 may locate a highest text variant weighting for each content control from the knowledge base. In 808, system 100 may select each text variant's clause and insert the selected clause into the matching template's normative form content control.

In 810, system 100 may determine whether content control has been set as editable. If so, in 812, system 100 may configure content for free text entry. If not, in 814, system 100 may configure content to only allow entry from text variants defined for that content control from the knowledge base. In 816, system 100 may associate a text variant list for each content control as alternative selections.

In 820, system 100 may generate the document according to the settings established throughout process 800. If system 100 received template ID submission from a web service, system 100 may generate the document with normative form content stream and applied text variants from content controls. If system 100 received template ID submission from a web form, system 100 may generate the document through the web form with content controls on the web page populated with applied text variants. FIG. 9 shows an example web form 900, and FIG. 10 shows an example with content controls populated with knowledge base information 1000. Text variant lists may be associated with each content control, and content control may be available for free text entry when content control is editable. An end user may choose to change the initially applied content control's text by selecting from the text variant list. The end user may choose to enter free text when content control is editable.

Figure 11:
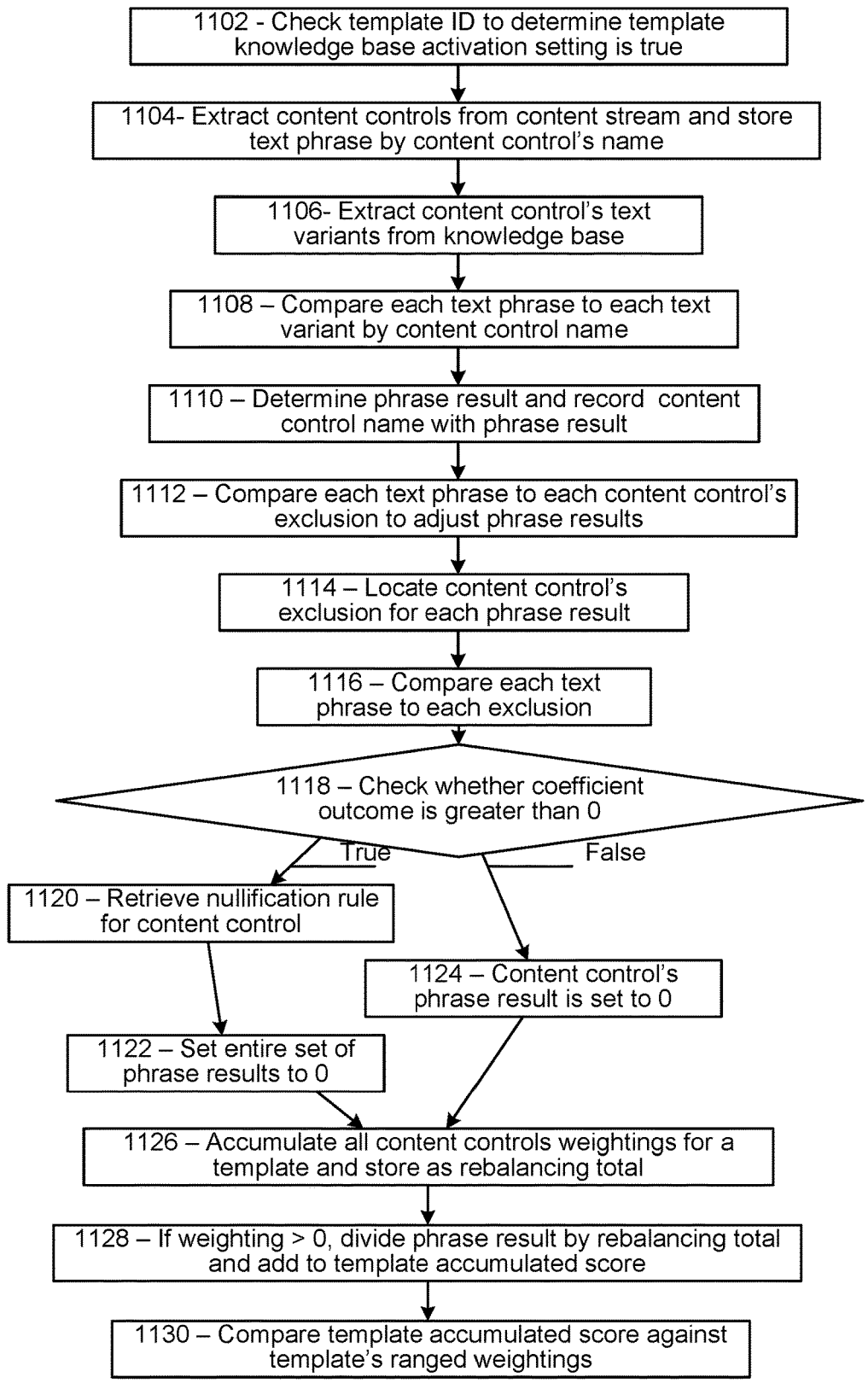
FIG. 11 is a predictive scoring process according to an embodiment of the invention.

FIG. 11 is a predictive scoring process 1100 according to an embodiment of the invention. System 100 may perform process 1100 to score a document, for example a document prepared according to process 800 described above. System 100 may perform process 1100 automatically, for example when a document is created or modified, in some embodiments. System 100 may perform process 1100 in response to user request entered through a user interface in some embodiments.

In 1102, system 100 may check to determine whether the template's knowledge base activation is set to true. If so, process 1100 may proceed. If not, process 1100 may be abandoned for this document.

In 1104, system 100 may extract content controls from the document's content stream and store text phrase by content control's name. In 1106, system 100 may extract content controls' text variants from the knowledge base by template ID utilized to construct content stream.

In 1108, system 100 may compare each text phrase to each text variant by content control name to gather phrase results. In 1110, system 100 may determine the phrase results and record content control names with associated phrase results. For example, system 100 may get a highest coefficient from a string compare amongst content control's text variants, multiply the coefficient by a text variant's weighting with highest coefficient score, and multiply the outcome by the content control's weighting to obtain the phrase result.

In 1112, system 100 may compare each text phrase to each content control's exclusion to adjust phrase results. For example, in 1114, system 100 may locate the content control's exclusion for each phrase result. In 1116, system 100 may utilize a coefficient to compare each text phrase to each exclusion. In 1118, system 100 may determine whether coefficient outcome is greater than 0, If so, in 1120, system 100 may retrieve nullification rule for content control and, in 1122, set just that content control's phrase result to 0. If not, in 1124, system 100 may set the entire set of phrase results to 0.

In 1126, system 100 may accumulate all content controls' weightings for the template and store them as a rebalancing total. In 1128, for each content control, if the content control's weighting is greater than 0, system 100 may divide the content control's phrase result by the rebalancing total and add the result to a template accumulated score.

In 1130, system 100 may compare the template accumulated score against the template's ranged weightings. For example, system 100 may determine a green, amber, or red outcome for the document, as described above. FIG. 12 shows an example outcome 1200. Here, the document has a green outcome.

Content Calibration and Recognition

This section describes systems and methods for calibrating text streams on demand to recognize a stream uniquely amongst a bound population of knowledge base configurations. For example, the stream may be recognized as a configuration uniquely identified by a template ID by content control density, content control ratio, and/or contiguous content control text variance frequency.

Figure 13:
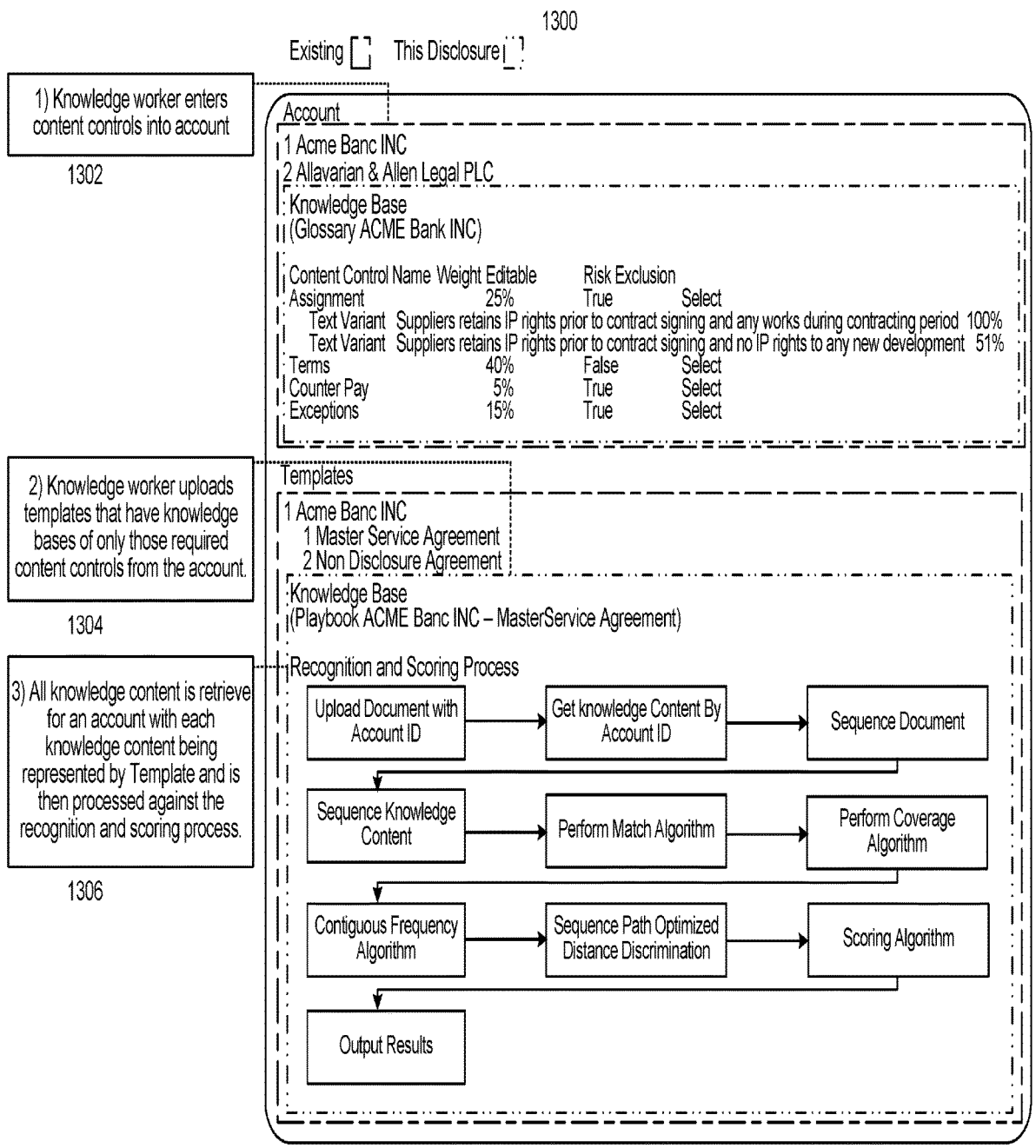
FIG. 13 is a content calibration and recognition process according to an embodiment of the invention.

FIG. 13 is a content calibration and recognition process 1300 according to an embodiment of the invention. Process 1300 is an overview of content calibration and recognition, and specific aspects thereof are expanded upon in this section. Process 1300 is presented from the perspective of a knowledge worker evaluating a template that has been created according to the teachings of U.S. Patent Publication No. 2014/0351686 and/or the actively adapted knowledge base processing described above.

In 1302, the knowledge worker may enter content controls into the account with which the template is associated. In 1304, the knowledge worker may upload the template and/or additional templates having knowledge bases overlapping with the content controls entered in 1302.

In 1306, system 100 may retrieve knowledge content for the account and process the template and knowledge content to recognize and score the data therein. These processes are described in greater detail below.

System 100 may be able to perform content calibration, recognition, and/or scoring when knowledge content sequences are described in one or more text variants, grouped by content control, and sequenced to specify phrase identification. System 100 may perform content calibration as text phrases are entered into content control text variants within the knowledge base. System 100 may perform content recognition occurs by comparing source content streams, utilizing a recognition algorithm, against knowledge content by adding or removing content controls and adding, removing, or changing text variants and text phrases within content controls that are within a knowledge base normative form until a desired match and coverage score are found. System 100 may perform content scoring by executing the scoring algorithm against a source content stream when weightings have been recorded for the content controls and text variants in the normative form's knowledge base.

System 100 may recognize and evaluate content. Knowledge base content may include a corpus of normative form content control text variants. A content control may provide a named identifier of a collection of text phrases within a normative form that contains zero to many variations of text phrases with optional weightings that identify the content control significance amongst the population of other content controls for a normative form. Each text variant may provide an identifier within a content control that may optionally be weighted with respect to a text variant's significance amongst the relationship of other text variants within a content control.

In the examples that follow, content that exactly matches a normative form may have a text variant weighting of 100%. As the match precision of the content decreases, the text variant weighting may also decrease.

The following is a first example non-disclosure agreement that may be evaluated by system 100:
Knowledge Content Normative Form Name: "Non Disclosure Agreement" ID: 1
  Content Control Name: "Termination" Weighting: 20% ID: 1
    Text Variant Weighting: 100% ID: 1
    This Agreement will commence on the Commencement Date and will remain in effect notwithstanding completion, fulfilment or early termination of the Purpose for a period of five years from the Commencement Date, save that Confidential Information about the Company's customers shall be kept confidential by the Recipient and Representatives indefinitely. Either Party may terminate this Agreement on 10 Days written notice to the other party. The obligations of this Agreement in relation to the Confidential Information will remain in force post termination.

The following is a second example non-disclosure agreement that may be evaluated by system 100 with some variations from the first example:
  Text Variant Weighting: 80% ID: 2
  This Agreement will commence on the Commencement Date and will remain in effect notwithstanding completion, fulfilment or early termination of the Purpose for a period of five years from the Commencement Date, save that Confidential Information about the Company's customers shall be kept confidential by the Recipient and Representatives indefinitely. Either Party may terminate this Agreement on 30 Days written notice to the other party. The obligations of this Agreement in relation to the Confidential Information will remain in force post termination.

The following is a third example non-disclosure agreement that may be evaluated by system 100 with more variations from the first example:
  Text Variant Weighting: 0% ID: 3
  There are no obligations for this agreement post termination. This agreement may be terminated by the receiving party at any time with 10 days written notice.

The following is a first example amendment agreement that may be evaluated by system 100:
  Content Control Name: "AmendmentandVariation" Weighting: 20% ID: 2
    Text Variant Weighting: 100% ID: 4
    No amendment or variation of this Agreement shall be effective unless it is in writing and signed by each of the Parties (or their authorized Representatives).

The following is a second example amendment agreement that may be evaluated by system 100 with variations from the first example:
  Text Variant Weighting: 0% ID: 5
  No party may amend this Agreement. Any such attempts must be done in a separate agreement supported by unique consideration.

The following is a first example unauthorized disclosure agreement that may be evaluated by system 100:
  Content Control Name: "Unauthorized Disclosure" Weighting: 20% ID: 3
    Text Variant Weighting: 100% ID: 6
    If the Recipient becomes aware that there has been unauthorized disclosure, copying or transfer of Confidential Information the Recipient will immediately inform the Disclosing Party and the Recipient will put procedures in place to prevent further unauthorized disclosure, copying or transfer of Confidential Information.

The following is a second example unauthorized disclosure agreement that may be evaluated by system 100 with variations from the first example:
  Text Variant Weighting: 0% ID: 7
  Whether recipient is aware on unaware this no such violation for unauthorized disclosure, copying or transfer of Confidential Information the Recipient will immediately inform the Disclosing Party and the Recipient will put procedures in place to prevent further unauthorized disclosure, copying or transfer of Confidential Information.

See also FIG. 15 for a user interface 1500 wherein knowledge content such as the above may be provided to system 100 by a user.

System 100 may sequence knowledge content, such as the example agreements presented above, according to the following formula. All text phrases may be grouped into numerically identifiable sequences by account ID, normative form (template ID), content control ID, content control editable, content control weight, text variant ID, text variant weight, and text phrase.

Using the ID values of the agreement examples provided above, the following:

This Agreement will commence on the Commencement Date and will remain in effect notwithstanding completion, fulfilment or early termination of the Purpose for a period of five years from the Commencement Date, save that Confidential Information about the Company's customers shall be kept confidential by the Recipient and Representatives indefinitely. Either Party may terminate this Agreement on 10 Days written notice to the other party. The obligations of this Agreement in relation to the Confidential Information will remain in force post termination.

may be encoded as follows:

1,1,1,1,25,1,100,1 This agreement will commence on the commencement date and will remain in effect notwithstanding completion 1,1,1,1,25,1,100,2 fulfilment or early termination of the purpose for a period of five years from the commencement date 1,1,1,1,25,1,100,3 save that confidential information about the company's customers shall be kept confidential by the recipient and representatives indefinitely 1,1,1,1,25,1,100,4 either party may terminate this agreement on 10 days written notice to the other party 1,1,1,1,25,1,100,5 the obligations of this agreement in relation to the confidential information will remain in force post termination The following is an example of sequencing content by sentence or clause:

Example Content

This Agreement may be executed in one or more counterparts, each of which shall be an original and all of which together shall constitute one instrument. This Agreement shall bind and inure to the benefit of the parties hereto and their successors and assigns. This agreement shall be governed and construed in accordance with the laws of the State of Euphoria, Dimsia; applicable therein without reference to rules governing choice of laws. If any action or proceeding arising out of or related to this Agreement is brought by either party; the parties hereto consent to the exclusive jurisdiction and venue in the courts located in the city of Dimsia, State of Euphoria. This document contains the entire agreement between the parties with respect to the subject matter hereof, and neither party shall have any obligation, express or implied by law, with respect to trade secret or proprietary information of the other party except as set forth herein. Any failure to enforce any provision of this Agreement shall not constitute a waiver thereof or of any other provision. This Agreement may not be amended, nor any obligation waived, except by a writing signed by both parties hereto.

Figure 14A:
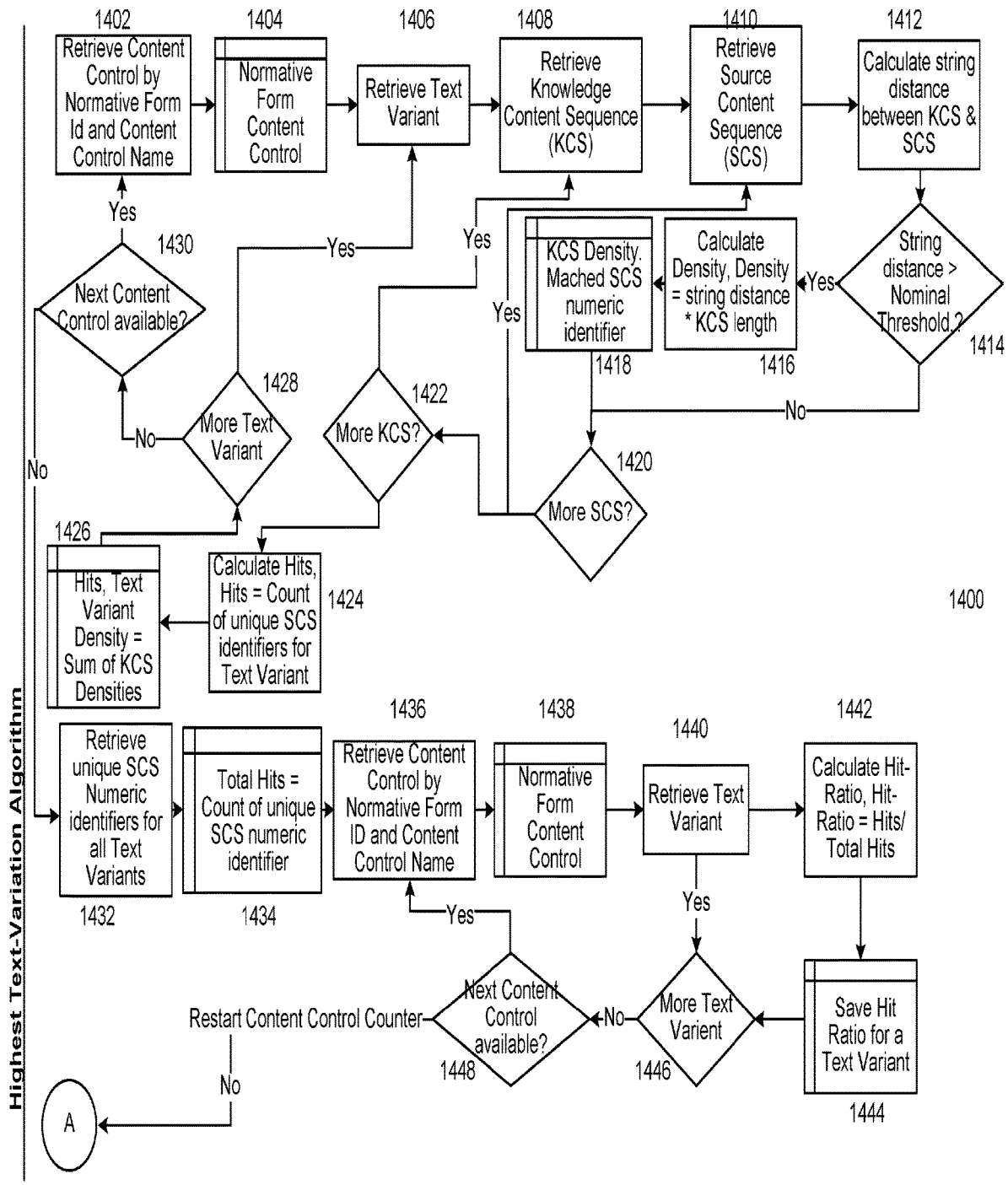
FIGS. 14A-14C show a recognition process according to an embodiment of the invention.
Figure 14B:
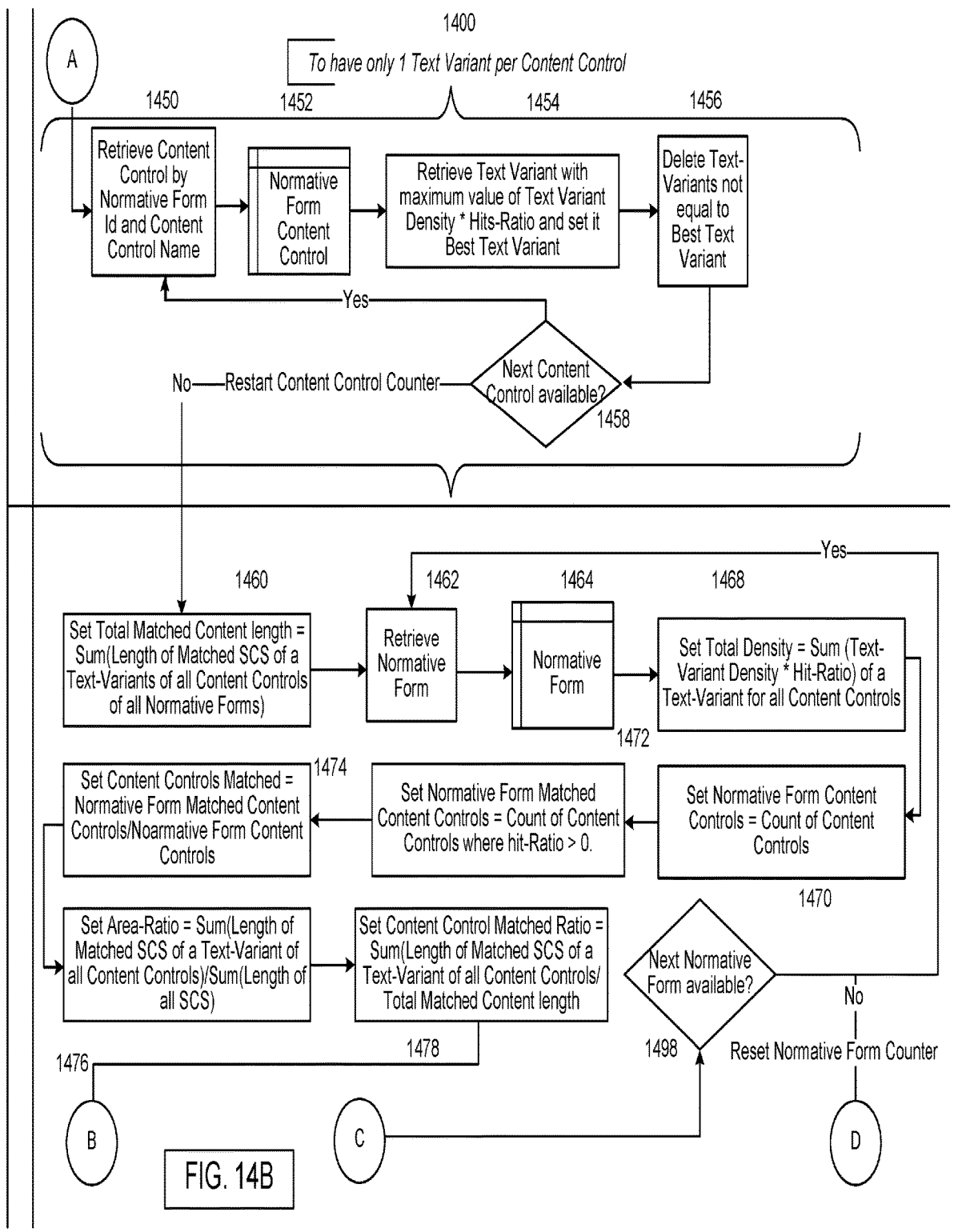
Figure 14C:
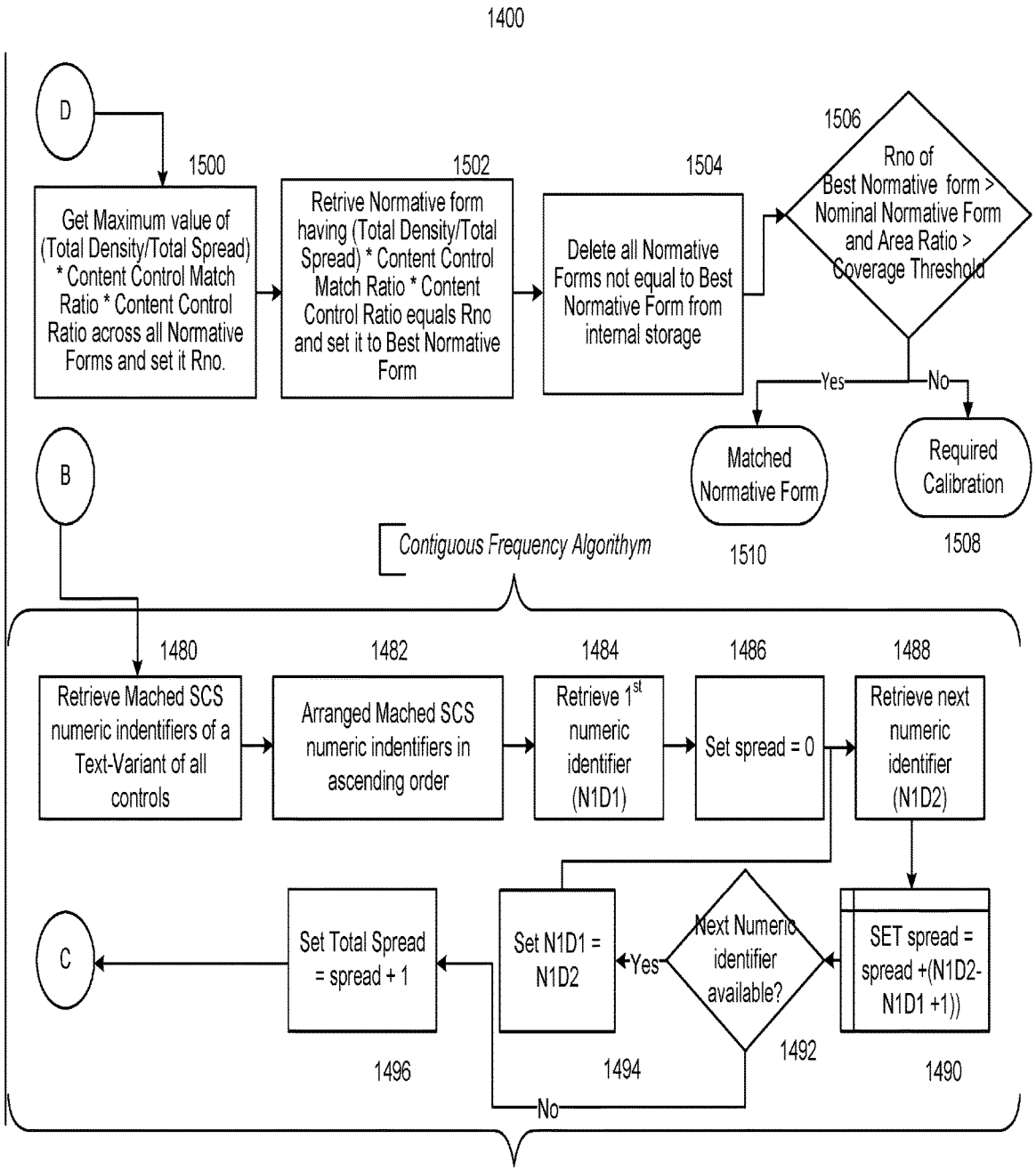

Sequenced Content:

1 This Agreement may be executed in one or more counterparts 2 each of which shall be an original and all of which together shall constitute one instrument 3 This Agreement shall bind and inure to the benefit of the parties hereto and their successors and assigns 4 This agreement shall be governed and construed in accordance with the laws of the State of Euphoria 5 Dimsia 6 applicable therein without reference to rules governing choice of laws 7 If any action or proceeding arising out of or related to this Agreement is brought by either party 8 the parties hereto consent to the exclusive jurisdiction and venue in the courts located in the city of Dimsia 9 State of Euphoria 10 This document contains the entire agreement between the parties with respect to the subject matter hereof 11 and neither party shall have any obligation 12 express or implied by law 13 with respect to trade secret or proprietary information of the other party except as set forth herein 14 Any failure to enforce any provision of this Agreement shall not constitute a waiver thereof or of any other provision 15 This Agreement may not be amended 16 nor any obligation waived 17 except by a writing signed by both parties hereto FIGS. 14A-14C show a recognition process 1400 according to an embodiment of the invention. System 100 may perform process 1400 to recognize and evaluate content. In process 1400, each normative form for an identified account may be retrieved for comparison. The highest text-variant match algorithm may be applied to each text variant of each content control of normative form. The normative form match algorithm may be applied to determine relevant normative form. Process 1400 may be performed in response to user command. For example, FIG. 16 shows an example user interface 1600 whereby a user may select a knowledge base for a document to be analyzed and a coverage threshold (e.g., defining what level of matching constitutes a match), and FIG. 17 shows an example user interface 1700 whereby the user may execute the recognition process for the selected data and receive results (e.g., scoring and coverage results). Once initiated, process 1400 may proceed as follows in some embodiments.

In 1402-1458, system 100 may process a highest text-variant algorithm. For example, system 100 may compare knowledge content sequences derived from the normative form (e.g. 1,1,1,1,25,1,100,1) to source content sequences using string distance (dice coefficient) to produce a coefficient for each sequence. A coefficient greater than a nominal threshold (e.g., 65%) may be regarded as a matched sequence. This may proceed as follows. In 1402, system 100 may retrieve a first content control. In 1404, system 100 may obtain normative form content control from the retrieved content control. In 1406, system 100 may retrieve a first text variant from the normative form content control. In 1408, system 100 may retrieve a first knowledge content sequence. In 1410, system 100 may retrieve a first source content sequence and, in 1412, system 100 may calculate a string distance between the knowledge content sequence and the string content sequence.

In 1416, system 100 may set matched sequence string distance multiplied with knowledge content phrase (e.g., 1,1,1,1,25,1,100,1—Confidential Information does not apply to any information that—63) length to density for each knowledge content sequence for each knowledge content, content control, and text variant combination. In 1418, system 100 may record densities and respective sequential numeric identifiers for each knowledge content, content control, and text variant combination.

In 1420, system 100 may determine whether there are any more source content sequences to evaluate and, if so, repeat steps 1410-1418 for each remaining source content sequence. In 1422, system 100 may determine whether there are any more knowledge content sequences to evaluate and, if so, repeat steps 1408-1420 for each remaining knowledge content sequence.

In 1424, system 100 may calculate a number of hits as a count of unique source content sequences per text variant. For example, system 100 may record a unique count of sequential numeric identifiers recorded for each knowledge content, content control, and text variant combination and set it to hits for each knowledge content, content control, and text variant combination. System 100 may record accumulated values of densities of matched knowledge content sequences for each knowledge content, content control, and text variant combination. In 1426, system 100 may determine hit text variant density as a sum of knowledge content sequence densities.

In 1428, system 100 may determine whether there are any more text variants to evaluate and, if so, repeat steps 1406-1426 for each remaining text variant. In 1430, system 100 may determine whether there are any more content controls to evaluate and, if so, repeat steps 1402-1428 for each content control.

In 1432, system 100 may retrieve unique source content sequence numeric identifiers for all text variants that have been evaluated. In 1434, system 100 may record a unique count of sequential numeric identifiers recorded for all knowledge content, content control, and text variant combinations and set it to total hits.

In 1436, system 100 may retrieve a first content control. In 1438, system 100 may obtain normative form content control from the retrieved content control. In 1440, system 100 may retrieve a first text variant from the normative form content control. In 1442, system 100 may calculate a hit ratio for the retrieved information. For example, system 100 may set hits divided by total hits to hit ratio.

In 1446, system 100 may determine whether there are any more text variants to evaluate and, if so, repeat steps 1440-1444 for each remaining text variant. In 1448, system 100 may determine whether there are any more content controls to evaluate and, if so, repeat steps 1436-1446 for each content control.

When all text variants and content controls have been evaluated, system 100 may establish a best text variant for each content control. In 1450, system 100 may retrieve a content control for evaluation. In 1452, system 100 may evaluate the normative form content control against the text variants for the content control for a best match using a combination of text variant density and hit ratio. In 1452, system 100 may set the text variant with the highest value of text variant density multiplied by hit ratio as the best text variant. In 1454, system 100 may save the best text variant and discard other text variants. In 1458, system 100 may determine whether there are any more content controls for which best text variants are to be found and, if so, repeat steps 1450-1456 for each remaining content control. Accordingly, this portion of process 1400 may identify a text variant from knowledge base content with highest resulting match per content control.

In 1460-1508, system 100 may apply a normative form match algorithm and contiguous frequency algorithm to determine whether entered data is a normative form and, if so, how closely it matches knowledge base data.

In 1460, system 100 may get sequential numeric identifiers across all normative forms' text variants of respective content controls and identify source content sequences (e.g., 3, 8, 12, 16). System 100 may accumulate identified source content sequences' length (e.g., 265) and set the length to total matched content length.

In 1462, system 100 may look up the normative form to be analyzed, and in 1464, system 100 may retrieve the normative form. In 1468, system 100 may set the total density of a text variant for all content controls (e.g., total density may be set to the sum of all text variant densities times hit ratios). In 1470, system 100 may set normative form content controls as a count of content controls. In 1472, system 100 may set normative form matched content controls as a count of content controls having positive hit ratios. In 1474, system 100 may set content controls matched as the normative form matched content controls value divided by the normative form content controls value. In 1476, system 100 may set area ratio as a sum of the length of matched source content sequences of a text variant multiplied by a sum of the length of all source content sequences. For example, for each normative form, unique sequential numeric identifiers (e.g., 3, 8, 12, 16) from all text variants of respective content controls may yield source content sequences' length (total length of 3, 8, 12, 16 sequences=265). Accumulated identified source content sequences' length (e.g. 265) divided by accumulated length (1191) of all source content sequences may yield area ratio (e.g. 265/719=0.3688). In 1478, system 100 may set content control matched ratio as a sum of the length of matched source content sequences of a text variant (e.g., 265) divided by total matched content length. Content control match ratio may serve as cumulative relative frequency.

System 100 may next apply the contiguous frequency algorithm. Sequential numeric identifiers may be recorded for knowledge content/content control/text variant combinations to calculate contiguous frequency, where contiguous frequency is a cumulative distance between sequential numeric identifiers recorded for knowledge content/content control/text variant. The algorithm may proceed as follows in 1480-1496.

In 1480, system 100 may retrieve matched source content sequence numeric identifiers for text variants for all content controls. In 1482, system 100 may arranged the matched source content sequence numeric identifiers in ascending order (e.g. 2,5,7,16). In 1484, system 100 may retrieve the first numeric identifier. In 1486, system 100 may set the spread to zero for the first numeric identifier. In 1488, system 100 may retrieve the next numeric identifier. In 1490, system 100 may set the spread to the current spread (i.e., 0) plus the result of adding 1 to current number to establish a product and subtracting subsequent number from the product. System 100 may record the result. In 1492, system 100 may determine whether another numeric identifier is available in the sequence. If so, in 1494, system 100 may advance to the next numeric identifier and repeat the processing of steps 1488-1492. System 100 may continue doing this operation until left with last number in the sequence. At this point, in 1496, system 100 may add all the recorded results and add 1 at the end. For example:

$$(5 - (2 + 1)) \rightarrow 2$$

$$(7 - (5 + 1)) \rightarrow 1$$

$$(16 - (7 + 1)) \rightarrow 8$$

$$\text{End Result} \rightarrow (2 + 1 + 8) + 1 = 12$$

System 100 may return the end result and, in 1498, system 100 may determine whether there is another normative form available for processing. If so, system 100 may repeat steps 1462-1496 for the next normative form. The final end result may serve as a total spread.

In 1500, system 100 may determine the relevant normative form. For example, system 100 may determine value of (total density/total spread)*content control match ratio*content control ratio for each normative forms as relevant normative forms. In 1502, system 100 may set the maximum relevant normative form value as the best normative form. In 1504, system 100 may discard other, lower relevant normative forms. In 1506, system 100 may determine whether this number is less than nominal normative form, and if area ratio is less than coverage threshold limit provided. If so, in 1508, system 100 may determine source content as ambiguous, and it may not be aligned with any normative form. If a normative form is not recognized, system 100 may calibrate knowledge base content to increase probability of matching (e.g., by making the content available for manual review by a knowledge worker, who may thereafter modify the knowledge base). However, if the number is greater than nominal normative form and the area ratio is greater than the coverage threshold limit, in 1510, system 100 may declare a matched normative form. The results of this processing may be provided by a user interface (e.g., interface 1700 of FIG. 17) as noted above.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method for automatic document generation comprising:

receiving, by a processor, client data;

automatically determining, by the processor, whether the client data is compliant with at least one content control standard, the determining including:

comparing, by the processor, text content of the client data with at least one text content word or phrase included within a text variant to determine a degree of variation indicating a percentage of text that differs between the text content of the client data and the at least one text content word or phrase included within the text variant, determining, by the processor, at least one weighting of the at least one text content word or phrase included within the text variant, generating, by the processor, a rebalancing total for the client data using the degree of variation and the at least one weighting, and determining, by the processor, that the client data is compliant with the at least one content control standard when the rebalancing total is equal to or greater than a threshold level; and in response to determining the client data is compliant with the at least one content control standard, automatically generating, by the processor, a processed document using the client data and a document template, and storing, by the processor, the processed document to a storage medium.

2. The method of claim 1, wherein automatically determining whether the client data is compliant with the text variant for the at least one content control standard comprises determining whether the client data is nullified by at least one nullification rule.

3. The method of claim 1, further comprising automatically validating, by the processor, the client data using unique identifiers of a document template to determine that the client data corresponds to the document template, the document template comprising at least one data tagging element mapped from at least one annotated document onto a base structure.

4. The method of claim 3, wherein:

the data tagging elements and the mappings collectively define a scheme for the document template, the unique identifiers comprise a unique identifier for the document template and a unique identifier for each data tagging element contained in the document template, and at least one content control for the at least one data tagging element comprises a text variant.

5. The method of claim 4, wherein the at least one content control comprises the at least one weighting for the text variant.

6. The method of claim 5, wherein each at least one weighting defines a score for client data corresponding to the text variant.

7. The method of claim 6, wherein the determining whether the client data is compliant with the at least one content control standard comprises adding the scores for the client data corresponding to the text variant to generate the rebalancing total.

8. The method of claim 7, wherein the client data is compliant with the at least one content control standard when the rebalancing total is equal to or greater than a first threshold value.

9. A method for automatic content recognition, the method comprising:

receiving, by a processor, client data;

automatically comparing, by the processor, the client data with normative form content for a document template, the normative form content including at least one text content word or phrase, the comparing including:

determining, by the processor, a degree of variation indicating a percentage of text that differs between text content of the client data and the at least one text content word or phrase included within the normative form content, determining, by the processor, at least one weighting of the at least one text content word or phrase included within the normative form content, and generating, by the processor, a rebalancing total for the client data using the degree of variation and the at least one weighting;

automatically recognizing, by the processor, that the client data corresponds to the document template based on the comparing indicating that the rebalancing total is equal to or greater than a threshold level;

automatically generating, by the processor, a processed document using the client data and the document template, and storing, by the processor, the processed document to a storage medium.

10. The method of claim 9, further comprising automatically determining, by the processor, a similarity between the client data and the document template based on the comparing.

11. The method of claim 9, further comprising encoding, by the processor, the normative form content, the encoding comprising grouping at least one text phrase in the normative form content into at least one numerically identifiable sequence.

12. The method of claim 11, wherein automatically comparing the client data with the normative form content comprises:

encoding, by the processor, the client data, the encoding comprising grouping at least one text phrase in the client data into at least one numerically identifiable client data sequence; and comparing, by the processor, the at least one numerically identifiable sequence with the at least one numerically identifiable client data sequence.

13. The method of claim 9, wherein:

the document template comprises a scheme defined by at least one data tagging element and at least one mapping of the at least one data tagging element from at least one annotated document onto a base structure, and at least one normative form for the document template comprises the normative form content including normative form content for each data tagging element.

14. The method of claim 13, further comprising automatically determining, by the processor, a similarity between the client data and the document template based on the comparing, wherein:

the document template comprises at least one content control corresponding to each data tagging element, the at least one content control comprising at least one text variant for the at least one content control; and automatically determining the similarity comprises:

determining a best text variant for each content control; and determining a match score describing a similarity between at least a portion of the client data and the best text variant.

15. The method of claim 14, wherein determining the match score comprises determining a string distance between the portion of the client data and the best text variant.

16. The method of claim 14, wherein determining the match score comprises determining a cumulative relative frequency for the portion of the client data.

* * * * *